Feb. 3, 1942.  W. L. BENEDICT  2,271,617
CONVERSION OF HYDROCARBONS
Filed May 25, 1939
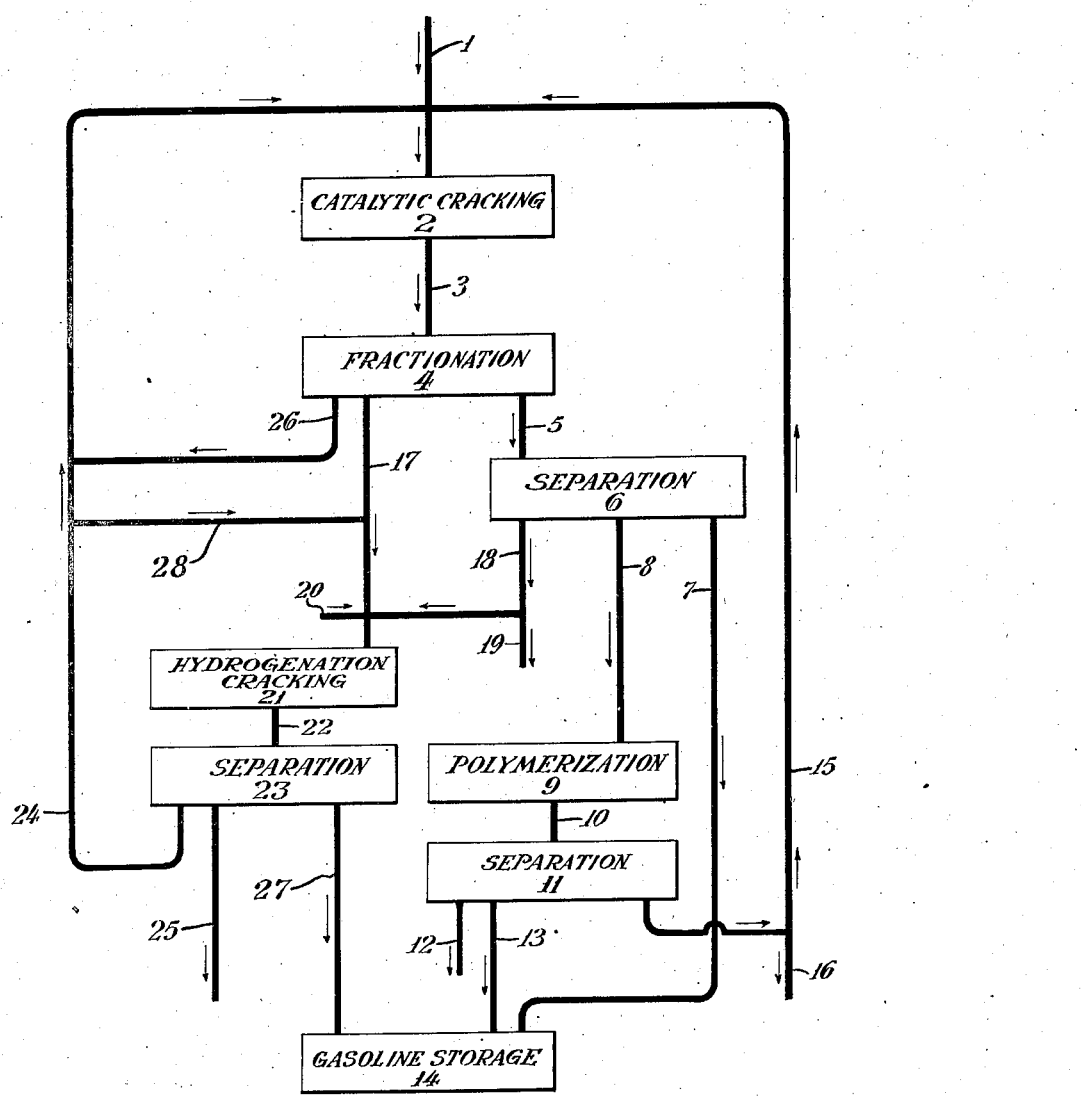
Inventor:
Wayne L. Benedict
By Lee J. Gary
Attorney.

Patented Feb. 3, 1942

2,271,617

UNITED STATES PATENT OFFICE 2,271,617

CONVERSION OF HYDROCARBON

Wayne L. Benedict, Chicago, Ill., assignor to Universal Oil Products Company, Chicago, Ill., a corporation of Delaware Application May 25, 1939, Serial No. 275,650

3 Claims. (Cl. 196—52)

This invention relates to catalytic conversion of hydrocarbons produced by the distillation of heavy hydrocarbonaceous materials, and more particularly, those of petroleum origin which are distillable at ordinary conditions without substantial decomposition. More specifically, the invention concerns the conversion of hydrocarbons by means of specially prepared catalysts into gasoline and desirable gaseous products so as to produce increased yields of motor fuel of premium quality. Although the charging stocks processed comprise distillates from petroleum sources, hydrocarbons produced by the primary distillation of coal tar, shale oil, and the like, may also be converted.

The art of producing gasoline and gas by non-catalytic cracking of petroleum oils is extensive and has been developed to the point where the principles involved are fairly well understood. The principles of catalytic cracking of hydrocarbons are not so well understood, and as a consequence the discussion of these reactions is best confined to a factual basis.

In one specific embodiment the present invention comprises contacting hydrocarbon oil with a cracking catalyst under conditions adequate to effect catalytic cracking, separating the gas and gasoline, contacting the unconverted oil together with hydrogen-containing gas with a catalyst mass consisting essentially of a mixture of a cracking catalyst and a hydrogenation catalyst under conditions adequate to effect further conversion into gasoline, recovering the gasoline, and returning a portion of the unconverted oil to the catalytic cracking step.

It is known that the unconverted oil remaining after passage through the cracking step is considerably more refractory toward the cracking catalyst than the original hydrocarbon fraction. As a consequence the ratio between the oil recycled to the cracking step and the original fraction charged is relatively high. The present process offers a method for separately processing the recycle stock in such a manner as to produce increased yields of high octane number gasoline under conditions such that the recycle ratio is materially reduced. The catalytic cracking step of the process is carried out under suitable conditions of temperature and pressure to bring about substantial conversion of the oil to gasoline and gas. The temperatures used are normally within the range of approximately 800–1200° F. and the pressures are substantially atmospheric, usually being only sufficient to permit ready passage of the oil vapors through the apparatus. The reaction products are separated, the gasoline is recovered, and the polymerizable olefins having three and four carbon atoms per molecule are passed to a catalytic polymerization step wherein they are converted to gasoline boiling range material. The unconverted fraction is combined with the hydrogen-containing gas from the cracking step and contacted with a catalyst mass which consists of a mixture of a cracking catalyst similar to that used in the catalytic cracking stage of the process together with a hydrogenation catalyst. The hydrogenation catalyst may comprise a reduced metal catalyst such as nickel, copper, iron, cobalt, chromium, etc., preferably on inert supports, but is more suitably a molybdenum oxide or molybdenum sulfide catalyst. The temperatures used in this step of the process are within the limits of approximately 700° and 1000° F., the pressures ranging from approximately 100 pounds to 1000 pounds per square inch and preferably being of the order of 500 pounds per square inch. After this step the oil may be recycled to the catalytic cracking step for which it is a suitable charging stock. Alternatively a portion of the unconverted oil from the hydrogenation-cracking step may be returned to said step rather than being returned to the catalytic cracking step. The gasoline produced is recovered and may be blended with that produced in the other steps of the process. As a further alternative a portion of the recycle stock from the catalytic cracking process may be returned to said process while the remaining recycle oil is passed to the hydrogenation-cracking step.

Although the cracking step of the present process may utilize cracking catalyst which may be produced by chemical treatment of naturally-occurring clays, the preferred catalyst comprises specially prepared synthetic masses; for example, silica-alumina, silica-zirconia, silica-alumina zirconia, silica-alumina-thoria, and similar refractory materials having a high degree of catalytic-cracking activity. These masses are prepared by various methods such as mixing and co-precipitation of the various components under conditions whereby alkali-metal ions are excluded. The ratio of the components may vary within wide limits and the masses may be considered to comprise intimate or possibly molecular admixtures, all the components indicating relatively low activity individually, but in the aggregate displaying high activity. The activity is not an additive function of the individual component, it being relatively constant for a wide range of proportions, either in molecular or fractions of molecular proportions. It appears that no one component can be determined as the one component for which the remaining may be considered as the promoter, according to conventional terminology. These catalysts are used in the form of sized particles or other formed shapes such as pellets, produced by compression or extrusion methods. The pressed composites are calcined at temperatures above 800° F. prior to contacting with the hydrocarbons. The character of the catalysts may vary somewhat depending upon the method of preparation and the composition, and should not be considered as being exactly equivalent in their action.

The catalyst used in the hydrogenation cracking step may comprise a mixture of the two types of catalysts in the form of separate pellets or as superimposed layers of particles of one type of catalyst on the other, or both catalysts may be intimately ground together and made into pellets. In certain cases it is advantageous to co-precipitate or otherwise mix the two types of catalysts at the time of manufacture. For example, the silica-alumina cracking catalyst mentioned above may serve as a support for hydrogenation type of catalyst which may be precipitated thereon and further treated if necessary to activate it, such as might be the case when the metal hydrogenation catalysts are used. The catalyst is reduced, in this case, to the metallic form after the particles have been made. Of the hydrogenation catalysts used molybdenum oxide or sulfide is preferred since this type of catalyst is not poisoned by sulfur compounds.

The $C_3$ and $C_4$ olefins produced in the catalytic cracking step are separated and subjected to catalytic polymerization. The polymerization catalyst may comprise the so-called solid phosphoric acid catalyst which is made by mixing liquid phosphoric acid with kieselguhr or similar suitable siliceous material, forming into regular shapes such as extruded pellets, and calcining. The polymerization step is carried out at temperatures within the range of approximately 250°–440° F. and pressures of 100–1000 pounds per square inch. Another suitable catalyst is sulfuric acid, polymerization in this case being carried out at temperatures of approximately 65°–250° F. with concentrations of acid of 60% or higher.

The attached drawing illustrates diagrammatically one embodiment of the invention. It should not be interpreted as limiting the invention to the exact conditions described or to any apparatus indicated therein.

Referring to the drawing the oil enters through line 1 and passes into the catalytic cracking step 2 wherein substantial conversion to gasoline and gas occurs. The reaction products pass through line 3 to a fractionation step 4 from which the gasoline and gaseous products are passed into separation step 6 by means of line 5. The gasoline is removed through line 7 to gasoline storage 14. The $C_3$ and $C_4$ olefins are passed to a polymerization step 9 by means of line 8. The reactions products pass through line 10 to separation step 11 wherein the residual gas is separated and removed from the system through line 12. The polymer boiling within the gasoline boiling range is removed through line 13 to gasoline storage 14. The polymers boiling outside the motor fuel range are returned to the catalytic cracking step by means of line 15 which joins with line 1. A portion or all of this polymer may be withdrawn from the system through line 16. The recycle oil from the fractionation step 4 is passed through line 17 and combines with hydrogen-containing gas from separation step 6 entering through line 18. A portion of the hydrogen-containing gas may be withdrawn from the system through line 19 or additional hydrogen may be added through line 20. The mixture of recycle oil and hydrogen-containing gas passes to the hydrogenation-cracking step 21 wherein substantial conversion to gasoline and gas occurs. The reaction products pass through line 22 to separation step 23. The gasoline is passed through line 27 to gasoline storage 14. The unconverted oil is passed through line 24 to line 1 by which it is returned to the catalytic cracking step. The residual gases are removed through line 25. As an alternative operation a portion of the unconverted oil from the catalytic cracking step 2 may be removed from fractionation step 4 through line 26 which combines with line 24 and line 1, and then passes to the catalytic cracking step 2. In this case the heavier bottoms of unconverted oil are passed through line 17 to the hydrogenation-cracking step 21. A further alternative consists in returning a portion of the unconverted oil from the separation step 23 by means of lines 24 and 28 to the hydrogenation cracking step 21. A further portion of the unconverted fraction may be returned to the catalytic cracking step.

The following example is given to illustrate the usefulness of the process and is not intended to limit it to the exact conditions given therein.

A Mid-Continent gas oil of 35.9° API gravity was catalytically converted according to the method described in the foregoing specification. The temperature of the catalytic cracking step was 932° F. and the temperature of the hydrogenation-cracking step was 750° F. The pressure in the catalytic cracking step was only sufficient to insure passage of the vapors through the apparatus. The pressure in the hydrogenation-cracking step was maintained at 800 pounds per square inch. The polymerization step was carried out using the so-called solid phosphoric acid catalyst at a pressure of 250 pounds per square inch and a temperature of 375° F. The yield of 80 octane number motor fuel amounted to 86%.

I claim as my invention:

1. A hydrocarbon oil conversion process which comprises contacting the charging oil, at a temperature in the approximate range of 800–1200° F., with an active cracking catalyst comprising a major proportion of silica and a minor proportion of a catalytic component selected from the group consisting of alumina and zirconia, thereby forming a substantial quantity of gasoline and heavier products more refractory to catalytic cracking than the charging oil, separating the gasoline from the heavier products, subjecting at least a portion of the latter, in admixture with hydrogen, to the simultaneous action of a cracking catalyst of the character aforesaid, and a hydrogenating catalyst at a temperature in the approximate range of 700–1000° F. and under pressure of about 100 to 1000 pounds per square inch, whereby to obtain a substantial yield of gasoline from said heavier products, fractionating the conversion products of the last-mentioned step and supplying fractions thereof heavier than gasoline to the first-mentioned catalytic conversion step.

2. The process as defined in claim 1 further characterized in that hydrogen produced in the first-mentioned conversion step is supplied to the second-mentioned conversion step.

3. The process as defined in claim 1 further characterized in that a portion of said heavier products is returned to the first-mentioned conversion step.

WAYNE L. BENEDICT.